United States Patent
Engdahl

[11] 3,740,757
[5] June 19, 1973

[54] PEAK SHOCK RECORDER
[76] Inventor: Paul D. Engdahl, 2850 Monterey Avenue, Costa Mesa, Calif. 92626
[22] Filed: Dec. 1, 1971
[21] Appl. No.: 203,713

[52] U.S. Cl. ................... 346/7, 73/70.2, 346/134, 346/135
[51] Int. Cl. ............................................. G01d 9/02
[58] Field of Search ................ 346/7, 77, 134, 135; 73/70.2, 402

[56] References Cited
UNITED STATES PATENTS
| | | | |
|---|---|---|---|
| 2,563,119 | 8/1951 | Kelly | 346/77 |
| 2,881,043 | 4/1959 | Rich et al. | 346/7 |
| 2,906,117 | 9/1959 | Kennard | 73/70.2 |

Primary Examiner—Joseph W. Hartary
Attorney—Lawrence Fleming

[57] ABSTRACT

A recording accelerometer of the general type known as a reed gage, for recording the shock spectrum of mechanical shocks of relatively long rise time, such as earthquakes. A plurality of cantilever reeds, each carrying an inertial mass and a stylus, are mounted in an array. Each stylus is disposed to "scratch" or emboss an arcuate line-like record on a record plate. Each plate has four recording surface locations, two on each side. Mechanical keying means are provided to insure that each plate is in its proper location and orientation, so that there can be no error in identifying the records made by the respective reeds. The natural frequencies of the reeds may cover the approximate range 2 – 25 Hz in one-third-octave steps. The instrument has no moving parts except the reeds themselves and requires no source of electrical or other power, and so may stand by for many years after installation and still reliably produce a record when a shock incident occurs. The combination of stylus and recording surface is of a novel type which permits identification of the peak excursions of each of the individual oscillations of a stylus on any single trace, so permitting recovery of the entire amplitude vs. time history of its oscillation — the time information being available from knowledge of the natural frequency of the reed.

13 Claims, 13 Drawing Figures

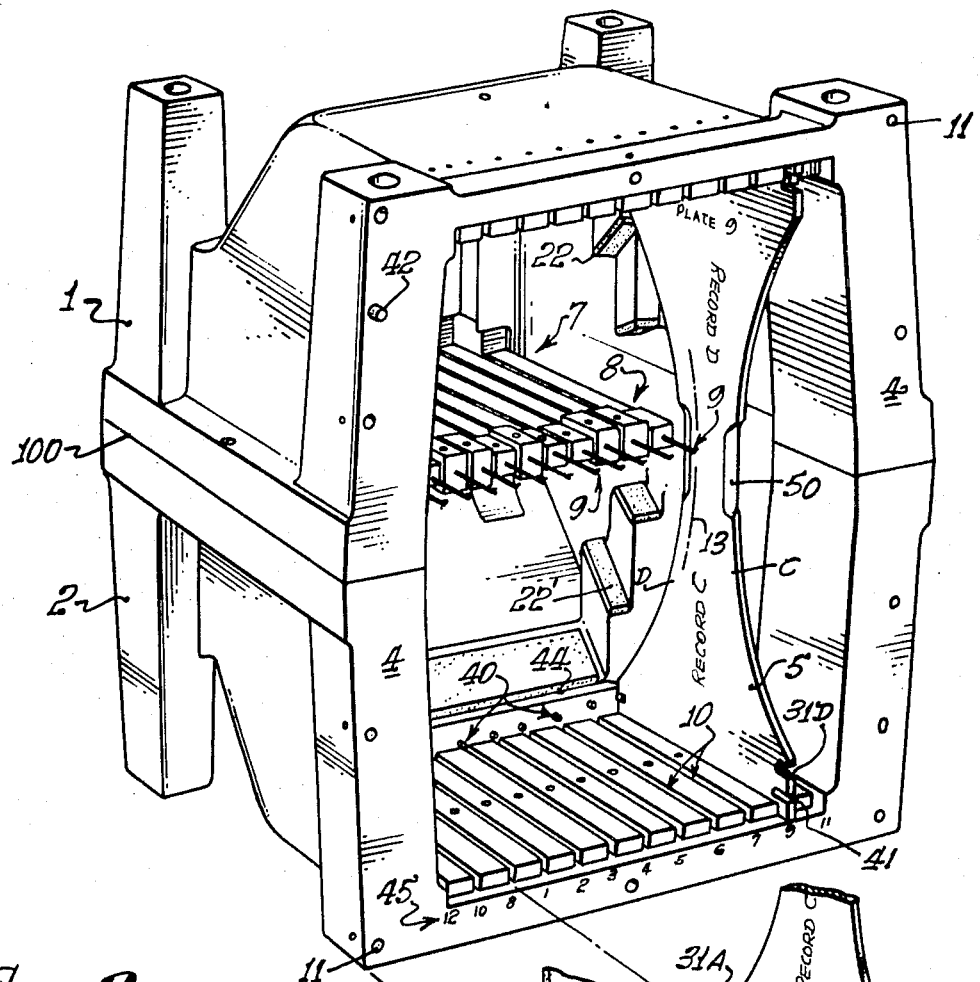
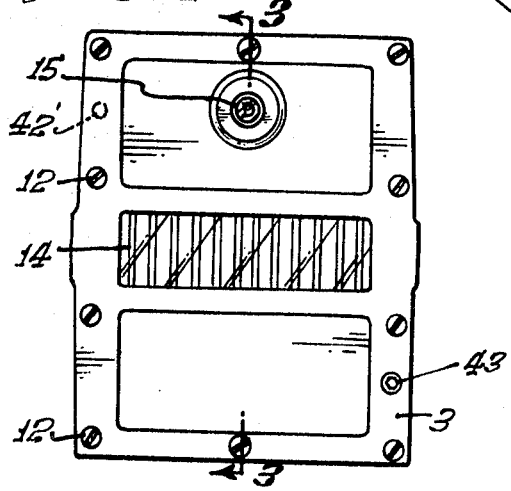
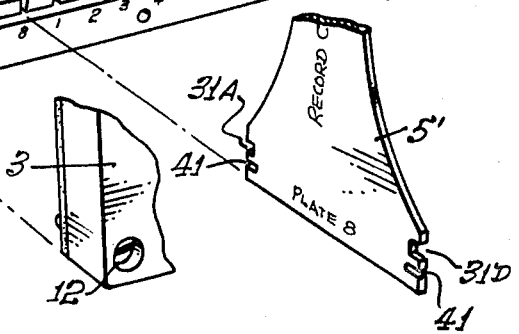

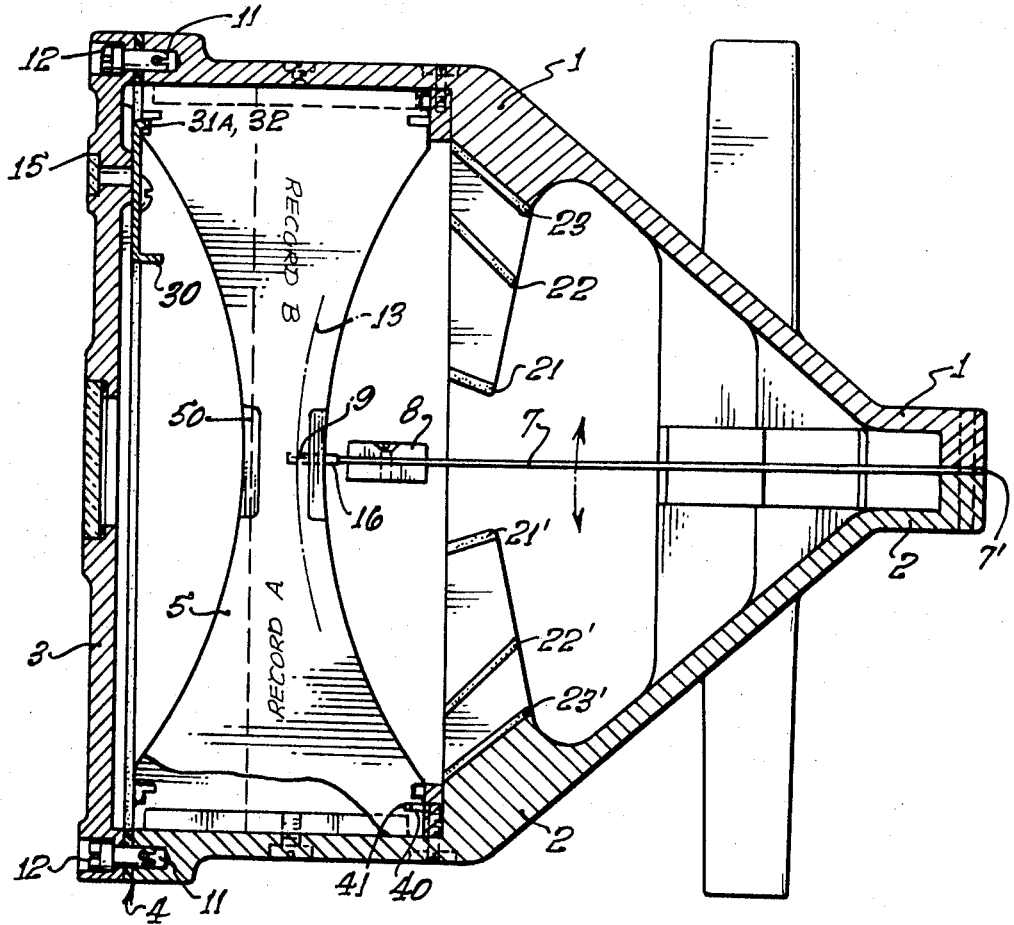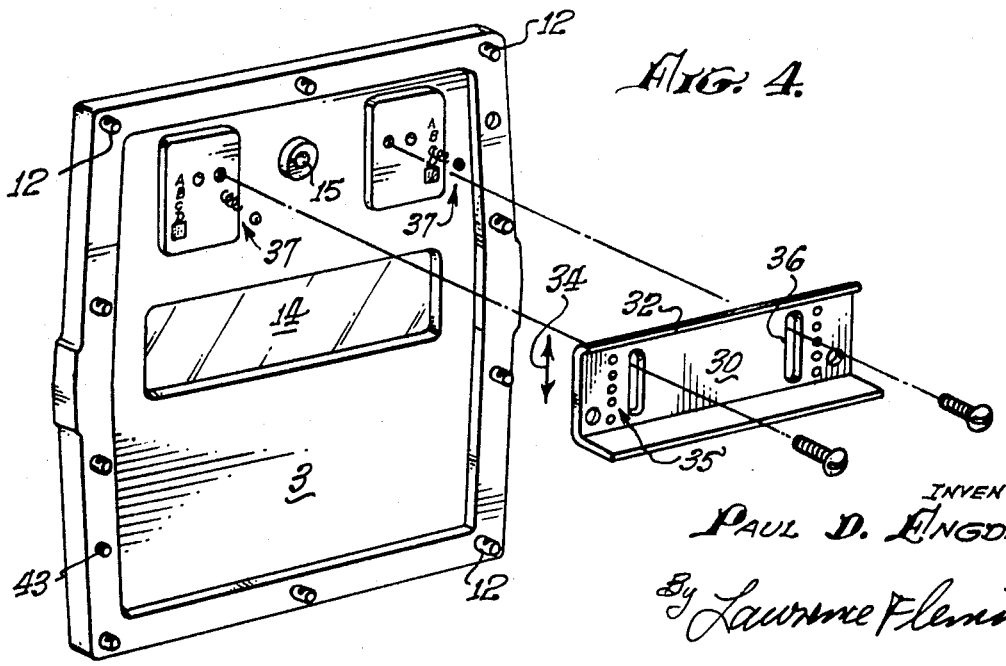

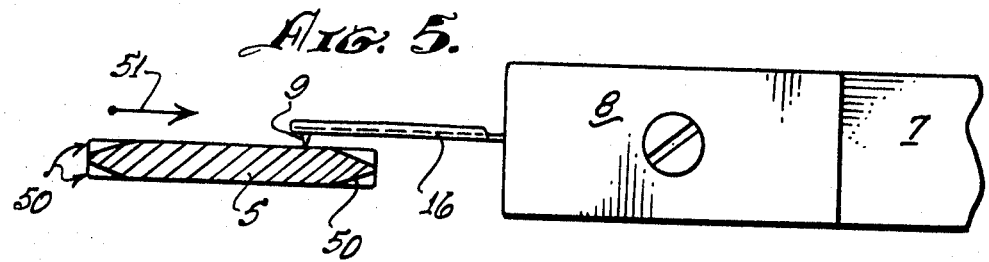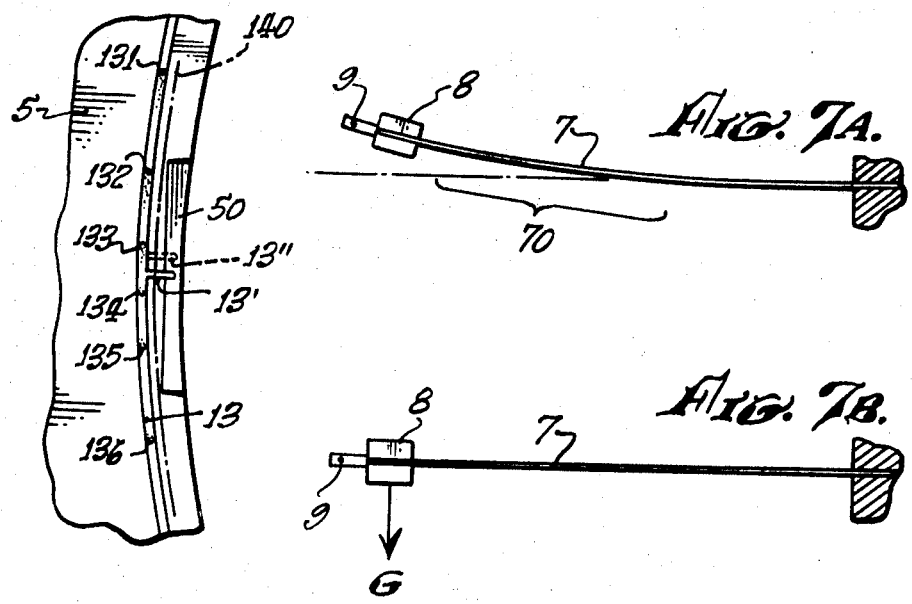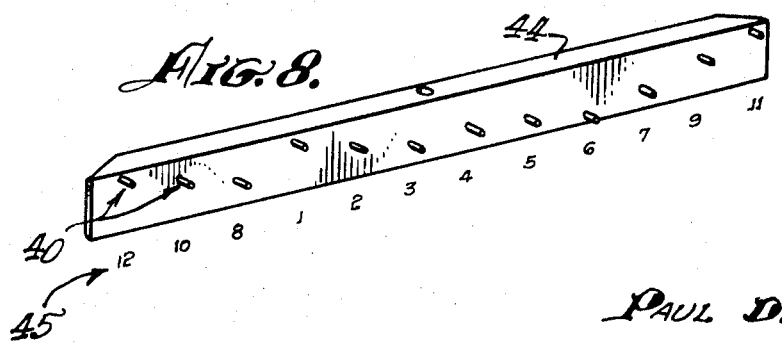

INVENTOR.
PAUL D. ENGDAHL,
By Lawrence Fleming
AGENT.

PEAK SHOCK RECORDER

BACKGROUND OF THE INVENTION

In the recording of earthquakes and other such shocks, instruments are needed wich are capable of standing by for long periods of time, e.g., many years, and then reliably making useful records of the earth movement. Accelerographs are known for such purposes which record the data on photographic film or paper or on magnetic tape. Batteries, electrical contacts, amplifiers, and transport mechanisms are involved. Records have been lost because, e.g., the mechanism stuck, relay contacts were oxidized, or the batteries had not been replaced. There is a need, therefore, for a recording instrument of this class which requires no periodic attention and will make records with unconditional reliability without regard to the length of the period of standby.

BRIEF SUMMARY OF THE INVENTION

The present invention is an earth shock recorder comprising an array of resonant mass-spring systems, preferably in the form of cantilever reeds, each carrying a mass and a stylus at its free end. In a preferred form of the invention, the natural frequencies of the reeds progress from 2 Hz to 25.4 Hz in one-third-octave intervals. The natural frequency of each reed is determined by the reed length and cross-section and the mass on the end; these are chosen to give the desired frequencies. Twelve reeds may be used.

Each of the styli may be affixed to a short flat spring member attached to the mass on the end of each reed. These stylus springs may have much higher natural frequencies than the reeds. Preferably, the tip of each stylus is located substantially on the center of torsional vibration of its reed and spring, so that incidental torsional vibration of the reed and its attached mass will have the least effect on the record.

The styli may be of diamonds, similar in general to phonograph pickup styli, and having tips rounded to radii of the order of 0.0004 to 0.0008 inch.

The record plates preferably are shaped in a generally rectangular fashion but with the long sides concavely curved, as shown in the drawing, in approximate conformity to the arcuate paths of the styli. These plates are preferably of metal with suitable plating and coating to accept embossed stylus records in a manner similar to the recording surfaces in my copending application Ser. No. 63,752, filed Aug. 14, 1970 now U.S. Pat. No. 3,683,397, issued Aug. 14, 1972. In FIG. 3 of that application, the embossing or "piling up" action of the stylus of the invention is shown as the stylus traverses back and forth along an arcuate linear path on the recording surface, whereby the individual peak termini of the excursions of the stylus along this path are each observable under a microscope, after the record is made; this obtains whenever the amplitudes of the stylus oscillations decreased with time. From the knownledge of the successive amplitudes thus obtained, and from knowledge of the natural period of the reed, it is shown in the above copending application that the history of the stylus excursion vs. time can be recovered. From the peak excursion, the spectrum of the mechanical shock to which the instrument was subjected can be calculated. There are no moving parts except the reeds themselves.

The present invention employs a similar concept for recording. In my copending application referred to above, the recording surface comprised a smooth metal substrate, with a nickel plating, then a gold flash, then an outer layer of "smut gold," which it was found would accept a suitable scratched, embossed or "plowed" record from the stylus. In the present invention, a cheaper type of surface is found to have the same suitable properties. It may comprise an aluminum alloy substrate plate, coated successively with a nickel plating, a copper flash, a thin plating of cadmium, a very tiin layer of porous cadmium, and for the outermost layer, a protective surface treatment such as commercial "Iridite." Other arrangements are given later herein. The record plates in the present invention are of the order of 100 times longer than those described in the above copending application. The peak excursion of a stylus trace or "scratch" are, however, individually detectible in the same manner as those of my earlier application.

According to the invention, provision is additionally made for making damping record traces from which the oscillatory damping of decay characteristics of each reed can be derived. A record plate is inserted part way, e.g., to within a few mm of its final position, the stylus riding closer to the arcuate edge of the plate than when it is fully inserted. The reed is then manually displaced and released. As is swings back and forth, its stylus will make an arcuate trace of continuously decreasing amplitude. Such a damping record is indicated by a dashed line 140 in FIG. 8, and will be described later in more detail.

The reeds of the present invention are arranged in a linear array, each recording on a record plate; the plates are stacked with suitable spaces in between, each held in grooves in the frame structure of the instrument.

Each plate has four recording surface portions, and each portion is identified with a specific reed and record. Novel mechanical keying means are provided, so that only a record plate keyed for position No. 1 will fit in the grooves or slots of position No. 1, and only a plate keyed for position No. 2 at position No. 2, and so on. A preferred keying means employs narrow notches cut in the corners of each plate, adapted to engage pins in the instrument frame. Each such pin is positioned differently, so that a plate inserted in the wrong position will not go all the way in, and the cover of the instrument will hence fail to close.

Each pin is a close fit in its mating slot, and locates the record plate accurately along the direction of its long dimension, so that the stylus zero line will be repeatable with a minimum of tolerance buildup.

Additional keying means are provided to insure that all the record plates inserted in the instrument have the same orientation, i.e., all with recording surface portion "A" in engaging relation to their respective styli, or all with surface portion "B," "C," or "D." These means preferably employ a second set of notches cut into each record plate. To engage these notches, a turned-up edge portion of an indexing member is provided. This member is slidable with a detent provision, into any of four positions corresponding to plate orientations "A"..."D." This indexing member is located on the cover of the instrument. When all the plates are in, say, orientation "A," so that recording surface portion "A" is engageable with the styli, their orientation notches are lined up, and will all be engaged by the edge portion of the indexer provided that the indexer has been slid into position "A." If it is not in position "A," the cover will not close. Operation is similar with positions or orientations "B"..."D." A fifth position of the indexer is provided for use in shipping the instrument, whereat the cover can be closed only if there are no record plates installed. Suitable legends are marked on the cover side of the indexer plate, which are visible through a window on the cover of the instrument, so that the orientation of the record plates therein, or their absence, can be ascertained by inspection.

It will now be apparent that the keying means of the invention insure positively that (1) each plate can be only in recording relation to its corresponding predetermined reed, and (2) all the record plates are in the same orientation, with the same designated record surface portions in recording relation to the styli. In addition, each set of record plates normally is serialized with the same serial number.

Accordingly, the structure of the invention provides automatically that each "scratch" or trace record on every record plate is positively identifiable as to which p1rticular reed made the record, and that the record traces on any particular plate portion "A"..."D" in a set will all have been made simultaneously.

The invention further provides for a reed-blocking element insertable in the frame in place of record plates, to be used when the instrument is shipped.

DETAILED DESCRIPTION

In the drawings:

FIG. 1 is a partial perspective view of an instrument according to the invention with the cover removed, showing one record plate in place;

FIG. 2 is a front view of the cover;

FIG. 3 is a side sectional view of an instrument showing a plate and reed in recording relation;

FIG. 4 is a perspective view of the cover from the back, showing the indexer device in exploded relation;

FIG. 5 is a side sectional view of a portion of a record plate with a stylus engaged therewith, showing also the end portion of a reed and mass;

FIG. 6 is an exaggerated view of a portion of a record made by a stylus;

FIG. 7A and 7B show a reed pre-bent for vertical-field operation, then straightened out by gravity;

FIG. 8 is a perspective detail of a set of plate locating pins;

Figure 9:
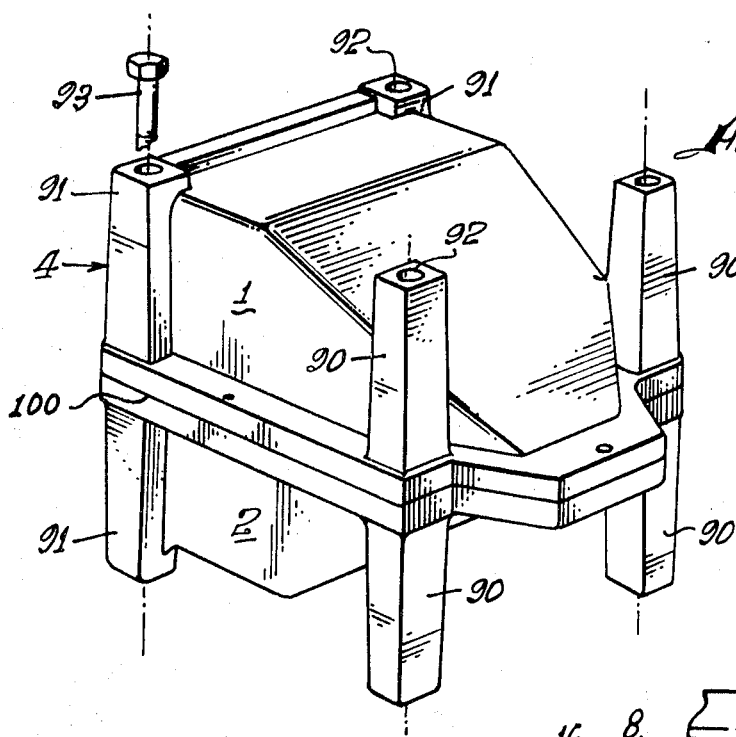
FIG. 9 is an exterior perspective view of a complete instrument from the back, with cover absent.

Referring now to FIG. 1, the case of the instrument may be made of two hollow castings 1 and 2 of aluminum alloy or other suitable material. A cover 3 is provided, which fits over the mating surface 4. Cover 3 is shwon more fully in FIG. 2, to be describd later. In FIG. 1, a set of record plates 5 is provided, one of which is shown in place. All fit into slots as indicated at 10; there are 12 such pairs of slots or grooves in a preferred form of the invention. A portion of another record plate is shown at 5', which would fit into the No. 8 slots in the frame of the instrument. Fastened in the mating portion of the case halves 1, 2, are the root ends of a set of reeds indicated generally at 7. Each reed carries a weight or mass 8, which in turn carries a stylus spring and stylus indicated at 9. Each stylus 9, when it oscillates, marks or "scratches" an arcuate linear record or trace 13 on its corresponding record plate, as plate 5. These are shown in more detail in later figures.

FIG. 2 shows a front view of the cover 3. It may be attached to the face portion 4 of the case 1, 2, by conventional quick-disconnected or other suitable fasteners as indicated at 12, which engage suitable pinned holes 11 in surface 4, FIG. 1.

A screw 43 may be provided, FIG. 2, which when screwed in will force or "jack" the cover away from the face 4, to break the seal when the gasket is stuck or the barometric pressure has increased. The end portion of screw 43, not shown, may be disposed to serve as a locating pin.

In FIG. 2, the cover 3 may be provided with a viewing window 14 for viewing the plates and reeds. It may also be provided with a small indexer window 15, through which may be seen the legends "A"..."D" on the indexer plate, to be described later.

FIG. 3 is a sectional view showing better the relation between a reed, stylus, and record plate. The root end of the reed 7 is clamped between the case halves 1, 2, at 7'. The case halves are preferably milled out accurately to fit the root ends of the reeds, and then assembled with epoxy or other suitable adhesive. The free end of each reed caries a mass 8, which in turn carries a stylus spring 16 and stylus 9. Stylus 9, when the reed 7 oscillates, will trace an arcuate path or record 13 on record plate 5.

Stops or bumpers are provided to limit the amplitude of oscillation of each reed. Three pairs of such stops are shown at 21, 21' – 23, 23' in FIG. 3. A pair is provided for each reed, located in accordance with the maximum permissible amplitude of oscillation of the reed as a function of its natural frequency. The stops 21, 21' are for a reed of relatively high natural frequency, e.g. and stop 23, 23' for a relatively low-frequency reed. The stops may be cast as integral portions of the case havles 1, 2, and may be padded with sponge rubber or the like. Portions of these stops or bumpers are also shown in FIG. 1 at 22, 22'.

It will be appreciated that the reeds of the present invention, like those ofmycopending application referred to above, will be forced into mechanical oscillation, each at its own natural frequency, when the case of the instrument experiences a transient acceleration as from an earthquake or explosion. Each stylus will trace an arcuate linear record on its co1responding record plate. From examination of the resulting records and knowledge of the natural frequency of the reed corresponding to each one, the spectrum of the applied shock acceleration can be computed. Qualitatively for example, a shock of short rise-time and short duration will excite the high-frequency reeds to a relatively greater extent that the low-frequency; and a shock of relatively long rise-time will excite relat1vely greater amplitudes of oscillation in the low41frequency reeds.

Turning now to the means for locating and indexing the record plates, it will be seen in FIG. 1 that each such plate, as 5 and 5', has two notches in each of its four corners. The narrower notches 41 are all located the same distance from the end edge of any individual plate, one near each corner. The location o2 these notches is, however, different for each plate, and is keyed to its position in the instrument, i.e., opposite reed No. 1, opposite reed No. 2, and so on. These notches 41 engage pins 40 in the frame of the instruement, which are visible in FIG. 1 and shown better in FIG. 8. By the use of this keying or locating means, a No. 8 record plaee, say, can be inserted only in slot No. 8 in the instrument. If it is not a No. 8 plate, its notch 41 will not engage the pin 40 at the end of the slot, and the plate will not go in all the way If any plate protrudes, the over 3 cannot be closed. FIG. 8 shows the general pattern of location of the locating pins 40. They are staggered, i.e., not in a straight row.

The above plate-keying and locating means insures that each record plate is installed opposite the particular reed for which it is marked. In addition, however, each plate has four record surface portions. In FIG. 1, for example, the stylus 9 is recording on record surface "D." If the plate 5 is removed and turned around, record surface "C" will lie under the stylus. If the plate 5 is turned upside-down, record surfaces "A" and "b" will be available. While this provides for economy in the use of plaes, it is necessary to insure tha all plates installed in the instrument at any one time be all in the same orientation "A"..."D." To provide for this, a second set of notches 31A...31D are provided in the corner portions of each record plate. Such notches are shown in FIGS. 1 and 3. The distance of all notches 31A from the end of a plate is the same; but different from that of notches 31B, and so on. Thus, if all the record plates are installed in the "A" position, all the notches 31A will line up, and so on with the "B"..."D" positions.

The invention provides for an indexer plate 30, mounted on the cover 3, which has an upturned edge portion 32 which engages these notches. It is shown in perspective in FIG. 4, and in cross-section, engaged with a plate 5, in FIG. 3. In FIG. 3, the engagement is at 31A, 32. It will be evident that if the notch 31A did not align with the indexer element 32, the cover 3 of the instrument would not go on all the way. Hence, all the plates such as 5 must be installed in the same orientation "A"..."D."

The indexer plate 30 is slidable to different positions, in the direction of arrow 34, FIG. 4. Each position is detented by some suitable means such as conventional sprin-and-ball elements 37 engageable with holes 35. These elements are shown as an exploded view in FIG. 4. Since the distance from an indexer notch 31A, etc. to the edge of the plate is different depending whether it is an "A" or "B," etc. notch, it is necessary to slide the indexer plate 30 to the proper one of its positions to fit these plate notches. The position of indexer plate 30 will determine the orientation of the record plates which it will fit.

Accordingly, the indexer plate 30 is provided with legends "A"..."D," one of which is visible through the viewing hole 15 (FIG. 4), corresponding to the position the indexer plate is in. Thus, when a set of record plates is installed correctly, the cover 3 can then (and only then) be closed all the way; and the plate orientation code "A"..."D" can be seen through the viewing hole 15.

An additional position is provided for indexer plate 30, whereat the cover cannot be closediif there are any record plates in the instrument at all in any orientation. When indexer plate 30 is in this position, a special legend such as a red dot is visible through hole 15. This position is provided for shipping the the instrument. In this shipping position, the indexer edge 32 is opposite a line where no notches are provided in any of the record plates.

Means are also provided to insure that the cover 3 can only be installed in one position, to remove the possibility of a 180° ambiguity. This may comprise a pin 42, FIG. 1, protruding from the face portion 4 of the case, which engages a hole 42', FIG. 2, in cover 3 when it is in the correct position.

Locating pins 42, 43 may be differently sized on a vertical and horizontal models of the instrument, so that a "V" cover will not fit on an "H" instrument, or vice versa.

Referring now to FIG. 5, there is shown in simplified form the engagement relation of a stylus 9 and a record plate 5. When a plate is being installed in the instrument, it is pushed toward the reed 7, stylus 9, etc. in the direction of arrow 51. To prevent the stylus 9 catching on the edge of the plate, each plate such as 5 is provided with a central beveled portion 50, which is visible in FIGS. 1, 3, 5, and 6. When the plate 5 is pushed into place, the stylus 9 will ride up along this bevel 50. In FIG. 5, it will be seen that the stylus spring 16 maybe deflected substantially, so that it will provide a relatively even pressure or force of the stylus 9 against the record plate surface.

FIG. 6 is a plan view of a portion of a record plate 5 showing a portion of a record 13, 13'. The width of the "scrath" or embossed record is exaggerated about 100 times in order to show how the individual peak excursions of the stylus are detectible under ammicroscope. The operation is similar to that in my copending application referred to above. At the peak of each individual swig or oscillation of the stylus, record plate material is piled up or deformed on a microscopic scale as at 131–136. The utilization of the information given thereby, in combination with the knowledge of the natural frequency of the reed 7 and mass 8, has been described earlier and in the above copending application Ser. No. 63,752, now U.S. Pat. No. 3,683,397.

As described earlier, a damping record may be recorded on the same plate 5, FIG. 6. Such a record is indicated schematically by dashed line 140. Its actual appearance may be generally similar to the main record 13. This damping record is obtained by inserting the plate 5 into the machine frame not quite all the way, then manually displacing and releasing the reed. The reed will execute a damped oscillatory motion, finally coming to rest at the center, as on line 13'. The individual peaks of its individual oscillatory excursion will be detectible under optical magnification, the same as the peaks 131–136 of the main trace. From their locations, the damping cahracteristics of the individual reed may be determined. This information is useful in interpreting the main record madebby the same reed, particularly during the early (largest amplitude) portion of the record when the oscillations of the reed are forced.

Such damping records typically show a generally linear decay of oscillations rather than exponential decay because the damping force is mainly the coulomb friction of the stylus. This divergence from the classical viscously-damped system is found, however, to have negligible effect on the accuracy of interpretation of the records, particularly during the important early portions.

When a record plate is inserted, the stylus will make an entry mark as at 13', FIG. 6. When the plate is later removed for interpretation of the record, the stylus will normally make an exit mark 13'' in the same place, so that the entry and exit marks are superimposed. If, however, the reed has suffered plastic deformation from the recorded shock, the exit mark 13'' will be displaced from the entry mark or scratch 13' as indicated by the dotted lines 13'' in FIG. 6.

FIGS. 7A and 7B illustrate the pre-bending or biasing of the reeds according to the invention, for use where the instrument is installed in a position to record the vertical component of an earthquake or shock. In this position, the reeds are horizontal, and sag under the acceleration of gravity. Since the reeds should all be initially aligned in a central position for best interpretation of the records, some biasing means is needed to counteract the static sag. No types of auxiliary spring-like biasing devices can be used because they would affect the natural frequencies of the reeds. I have found, however, that a reed intended for such service may be pre-bent during manufacture into a suitable curve 70 as indicated in FIG. 7A. When it is installed in a horizontal position as in FIG. 7B, the acceleration of gravity indicated at G will straighten it out. There are theoretical considerations that suggest that such a pre-bent reed would have a somewhat different natural frequency than a straight reed of identical material and dimensions. I have found, however, by tests, that any such errors are within the normal one percent limit of error of the instrument. The instrument shown in FIG. 1 is oriented to record vertical components of acceleration, and so would have reeds 7 suitable pre-bent.

FIG. 8 shows in perspective the bar-like structural element 44 mounted in the instrument case, provided with a non-aligned row of record plate locating pins 40 as earlier described, to engage the notches 41 in the record plates. The numerals 1–12 in FIGS. 1 and 4, designating the plate positions, correspond to the record plate numbers, and are numbered in ascending order of natural frequency. This row of numerals is designated generally as 45.

FIG. 9 is a rearward perspective view of the case of the instrument, showing its gerral shape. The case halves 1, 2 may be assembled with an adhesive after the reeds 7 are installed. The case may have integral projections 90, 91 whose ends lie substantially in a plane. Holes 92 are provided which pass through the case. The instrument may thus be mounted solidly to a horizontal or vertical surface by through-bolts such as 93. The two cases halves 1, 2, fit together along a plane 100.

Figure 10:
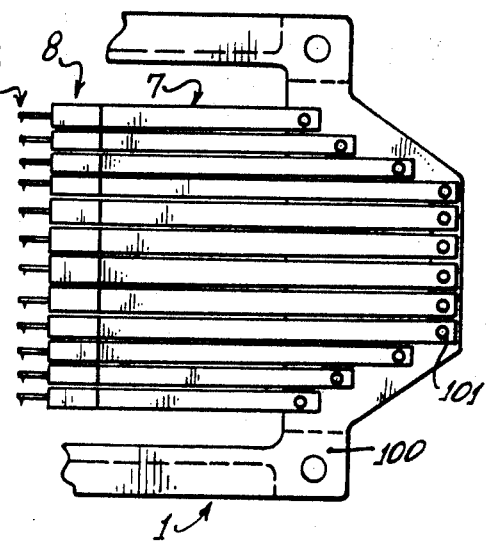
FIG. 10 is a partial side sectional view showing a set of reeds mounted in place.

FIG. 10 is a partialsectional view showing the positioning of the reeds 7 in one of the case-halves 1. They may be located by pins as 101. Their root portions are permanently fixed in place when the case havles 1, 2 are attached together. In FIG. 10, it will be seen that the case shape porvides for reeds of different length. The longer, lower-frequency reeds Nos. 1–6 are mounted in the center portion of the case, and the higher-frequency reeds Nos. 7–12 at the side portions.

Figure 11:
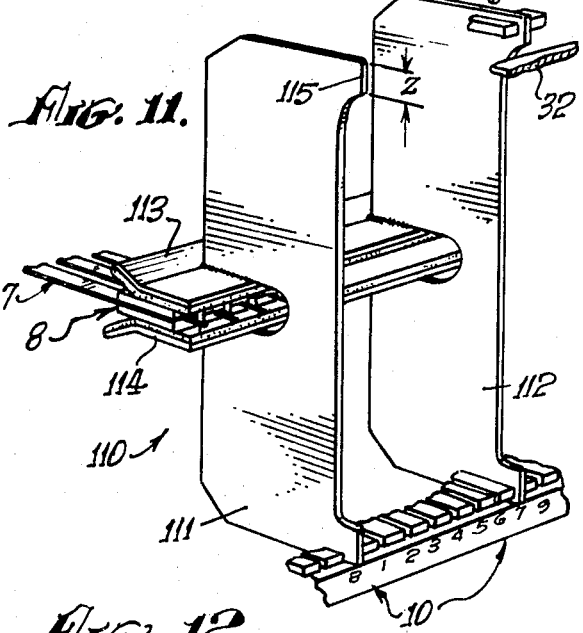
FIG. 11 is a perspective view of the blocking element engaged with some reeds, for shipping.

FIG. 11 shows the reed-blocking element 110 inserted in the instrument in place of the record plates for shipping. It may be made of sheet metal, and may comprise two frame plates 111, 112 shaped so as to slide into two of the slots 10 which are provided to hole the record plate2. Fastened to the frame plates 111, 112 are blocking plates 113, 114, so shaped as to fit around the masses 8 on the reeds 7, to prevent them from swinging back and forth. The blocking plates may have diverging portions as shown, and be lined with foam rubber or other soft material to engage readily and to protect the reed structures 7, 8 during shipment. The dimension Z or corner portions 115 of frame plates 111, 112 may be made smaller than the corresponding dimension on a record plate, for proper cooperation with the indexer plate 30 (FIGS. 3 & 4). When the indexer plate 30 is in the fifth position (for shipping — no record plates), its edge portion 32 will lie in a position such as is shown in FIG. 11. The dimension Z at corners 115 is made small enought to clear the indexer plate edge 32.

Figure 12:
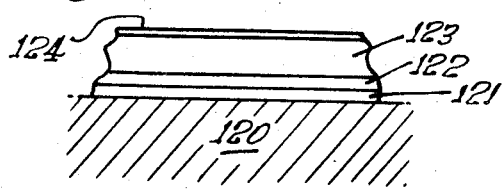
FIG. 12 is a greatly enlarged cross-section of a portion of the surface of a record plate, showing the layers on the substrate.

FIG. 12 is a greatly-magnified diagrammatic cross-sectional view of a small portion of the surface portion of a record plate such as 5. The surface portion of the plate is indicated in FIG. 12 at 120. Over this substrate may be a plating of nickel 121, a copper plating 122, a layer of plated cadmium 123, and lastly a thin plating or flash of porous cadmium or "burnt cadmium" 124. Over this may be provided a suitable protective surface treatment such as that sold commercially as "Iridite," which fills the pores of the metal and resists fingrrprints and the like. It also provides color contrast.

A simpler recipe, found satisfactory, provides only three layers over the base aluminum: nickel plate, then porous cadmium, and lastly "Iridite" or the like.

In operation, the scratching or embossing action of the stylus takes place in the porous cadmium layer, which is suitably soft. The nickel (or the copper in the more elaborate layer structure above) is provided as a relatively hard substrate. Porous or "burnt" cadmium may be applied, as is known, by processes similar to ordinrry cadmium electroplating, but with the current density changed to provide the desired porosity.

The record plate substrate 120 is desirably of the same material, as aluminum, as the instrument frame 1, 2, to minimize zero shifts of the traces due to differential thermal expansion of the metals.

I claim:

1. An instrument for recording transient acclerations, comprising:
    an array of substantially coplanar resonant reeds of progressively graded natural frequencies;
    a mass, a stylus suspension spring, and a stylus on the end portion of each said reed; and
    a separate stationary substantially rigid record plate disposed in mechanical recording relation to each shaid stylus and substantially parallel to its plane of oscillation,
    each said stylus being adapted to make a main oscillatory record on said plate solely in the form of a single embossed-like arcuate line, and
    each said record plate having an embossable surface adapted to make detectible the position along said line of the terminus of an individual peak excursion of oscillatory motion of said stylus.

2. An instrument as in claim 1, further comprising:
    slots in the frame of said instrument adapted to slidably receive each of said record plates,
    designations on said slots and on said plates,
    and keying means to prevent normal operation of said instrument when any said plate occupies any slot of non-matching designation.

3. The instrument of claim 2, wherein:
said slots are adapted to receive said plates in positions substantially short of complete insertion,
whereby damping trace records of said reels may be obtained parallel to said main oscillatory records.

4. An instrument as in claim 2, wherein:
said keying means comprises notches in said plates each located according to the designation of that plate, and
means to engage said notches correspondingly located in said instrument.

5. The instrument of claim 4, wherein:
said pins are precisely located in the instrument frame and fit snugly into said slots,
whereby said pins serve as accurate locating means for said plates along the direction of said record.

6 An instrument as in claim 1, wherein:
each said plate has a plurality of recording positions determined by its orientation,
each said plate fitting into said slots in a plurality of said orientations, and
each said plate is provided with indexer keying means keyed by distinguish among said orientations.

7. An instrument as in claim 6, wherein:
said indexer keyng means comprises notches in each of said record plates, and
a movable indexer plate having an indexer member engageable with said notches;
said indexer member being disposed generally perpendiculary to the plane of said plates and being engageable with all said notches in all said plates only when all said notches are aligned.

8. The instrument of claim 7 wherein:
the case of said instrument is provided with a viewing hole opposite a portion of said indexer plate, and
said plate is provided with record plate orientation designations which are visible through said hole.

9. An instrument as in claim 1, wherein:
the tip of each said stylus lies substantially on the axis of natural torsional oscillation of the combination of said reed and said mass.

10. The instrument of claim 1, wherein:
each said record plate is plated with a layer of a relatively hard metal, and then a thin layer of a relatively soft material.

11. An instrument as in claim 1 for operation with the plane of said reeds substantially horizontal for recording the vertical components of accelerations, said reeds being subject to static gravitational bending forces, wherein:
all said reeds are pre-bent to a degree to make them lie substantially straight when subjected to said forces,
said reeds thereby having each substantially the same natural frequency as before being pre-bent.

12. An instrument as in claim 1, further comprising:
a case having mountmounting means for the root ends of said reeds, and means for removably mounting said record plates in recording relation to said styli;
a cover removably fixable to anoopen portion of said case adjacent said plaes;
indicia on said cover; and
mechanical locating elements permitting installation of said over only in a predetermined orientation.

13. An instrument as in claim 12, further comprising:
gasketing means and retractable fasteners adapted to attach said cover removably to said case with a substantially hermetic seal, and
a screw in said cover adapted to be screwed inward against a portion of said case to exert a force to break said seal, to facilitate removal of said cover.

* * * * *